Aug. 14, 1956 R. K. PEPPER 2,758,688
POSITIVE CLUTCH SHAFT COUPLING

Filed July 7, 1955 3 Sheets-Sheet 1

INVENTOR.
ROBERT K. PEPPER
BY Richard von K. Bruns
Attorney

Aug. 14, 1956  R. K. PEPPER  2,758,688
POSITIVE CLUTCH SHAFT COUPLING
Filed July 7, 1955  3 Sheets-Sheet 2

INVENTOR.
ROBERT K. PEPPER
BY
Attorney

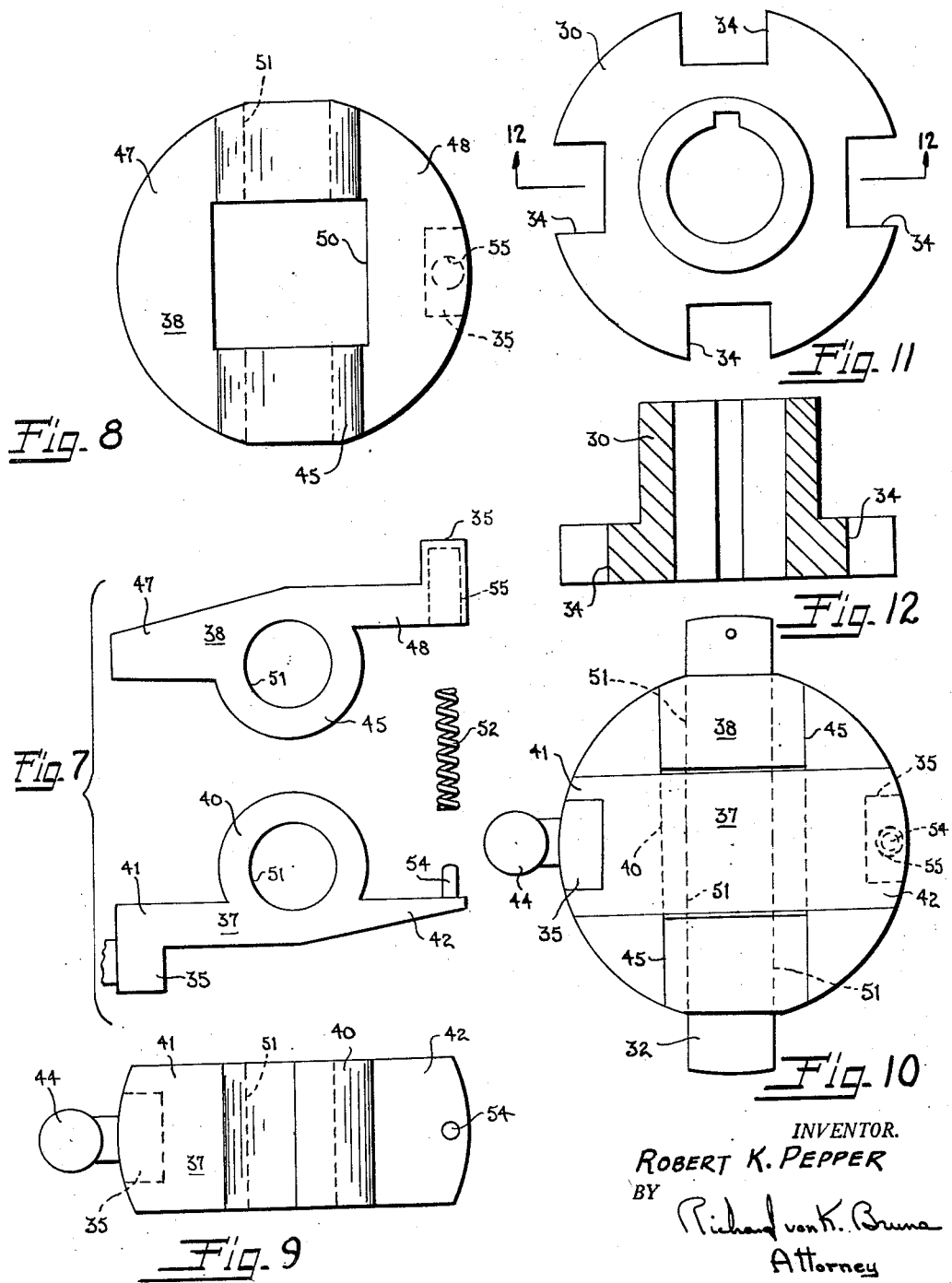

United States Patent Office 2,758,688
Patented Aug. 14, 1956

2,758,688

POSITIVE CLUTCH SHAFT COUPLING

Robert K. Pepper, Syracuse, N. Y.

Application July 7, 1955, Serial No. 520,500

5 Claims. (Cl. 192—48)

This invention relates to clutching devices, and has particular reference to a positive clutching or coupling device for the front wheel axles of an all-wheel drive vehicle.

In most all-wheel drive vehicles manufactured at the present time, some provision is made for disengaging the front-wheel drive from the remainder of the power train to permit more efficient operation of the vehicle during long runs over smooth roads, or at other times when the rear-wheel drive alone is adequate. However, even though no power is applied to the front-wheel drive, the rotation of the front-wheels during movement of the vehicle causes continued rotation of the front axle differential case, the ring gear and drive shaft, and results in needless loss of power and wear on the parts.

In order to eliminate this condition and insure the most efficient possible performance of the vehicle when it is operating with the front-wheel drive disengaged, the present invention contemplates, and has as its principle object, the provision of a device which permits the front-wheel axles to rotate entirely independently of the drive assembly associated therewith. When it is necessary to apply power to the front-wheel drive, however, the device may be operated to lock the axles and differential case together to provide a positive driving front axle in either the forward or reverse direction. In accordance with the invention, the device is preferably in the form of a positive clutch axle coupling arrangement and is located in the differential case, certain conventional differential parts being replaced by the device as will be more fully explained hereinafter.

In addition to the broad objective stated above, another important object of the invention is to provide a positive clutch axle coupling device which may be actuated by means of conveniently located controls within the cab of the vehicle.

A further important object of the invention is to provide an axle coupling device wherein the coupling means is a rugged, positive acting assembly, a positive jaw clutch arrangement being employed for this purpose.

Still another important object of the invention is to provide an axle coupling device which is strong and durable and yet is relatively inexpensive to manufacture.

A still further important object of the invention is to provide an axle coupling device which can be easily incorporated into existing differential assemblies.

Other objects and advantages of the invention will become apparent from the following detailed description thereof read in conjunction with the accompany drawings which illustrate a typical embodiment of the invention for the purpose of disclosure.

In the drawings:

Figure 7 is a side elevation of the essential parts of the male coupling unit in exploded form;

Figure 8 is a bottom plan view of the upper male coupling element shown in Figure 7;

Figure 9 is a top plan view of the lower male coupling element shown in Figure 7;

Figure 10 is a plan view of the male coupling unit in assembled form;

Figure 11 is a plan view of a female coupling member; and

Figure 12 is a vertical section taken along line 12—12 of Figure 11.

Figure 3:
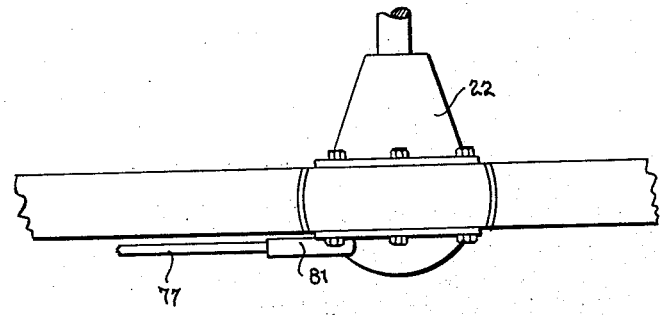
Figure 3 is a plan view corresponding to Figure 2.

Having reference now to the drawings, wherein like reference numbers designate the same part in all the views, the invention is illustrated for the purpose of disclosure as being incorporated in a four-wheel drive truck although it is broadly applicable to any type of all-wheel drive vehicle, tractor trailer arrangement, or the like. The truck is generally indicated at 15 in Figure 1, and includes the usual transfer case 17, universal joints 18, forward and rear drive shafts 20, 21 and forward differential carrier 22. The carrier encloses the drive pinion 24, ring gear 25 and differential case or housing 27, Figure 4, the inner ends of the front-wheel axles 28 terminating within the case in the conventional manner.

In accordance with the invention, the axle gears and differential pinions are removed from the ends of the axle shafts and differential case respectively, and these parts are replaced with an axle coupling device which comprises a pair of female coupling members 30 and a male coupling unit generally indicated at 31. Members 30 are keyed, splined or otherwise fixed to the ends of the axle shafts 28, while the male coupling unit 31 is rockably mounted between the members on a stub shaft 32 which is supported at each end in diametrically opposed bores (not shown) that were originally formed in the case or housing 27 for the support of the differential pinions. The coupling device is preferably in the form of a positive or jaw clutch, the female members 30 being provided with notches 34, Figures 11 and 12, adapted to receive oppositely disposed dogs 35 on the male coupling unit when the clutch is in engaged position.

Figure 4:
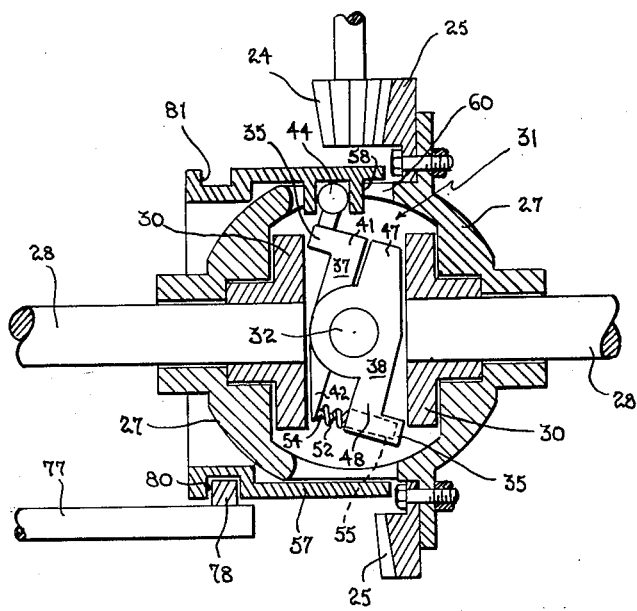
Figure 4 is a horizontal section through the differential case showing the coupling device in disengaged position.

The male coupling unit 31 is comprised of two separate inter-engaging elements 37, 38 which are independently rockable on the stub shaft 32. Element 37 is substantially rectangular in the plan view, and is formed with a centrally disposed cylindrical portion 40 and a pair of arm portions 41, 42 which project outwardly from opposite sides of the cylindrical portion. A dog 35 is formed on one side of the arm 41, and an actuating knob 44 projects outwardly therefrom for engagement with the actuating mechanism to be described hereinafter. Element 38 is substantially circular in the plan view and, like element 37, is formed with a centrally disposed cylindrical portion 45 and outwardly projecting arm portions 47, 48, a dog 35 being formed on one side of the arm 48. Element 38 is provided with a substantially square central aperture 50 which is slightly larger than the cylindrical portion 40 of the element 37 so that the latter can be received therein, the cylindrical portions of the elements fitting together in hinge fashion with the bores 51 therethrough being in alignment so that the stub shaft 32 can be passed through the bores to maintain the parts in assembled form. A compression spring 52 is interposed between arm portions 42 and 48 of the elements, one end of the spring engaging a pin 54 on the arm portion 42 and the other end being positioned in a bore 55 in the arm portion 48. One purpose of this spring is to maintain the inner surfaces of arm portions 41, 47 and 42, 48 in substantially parallel relation when the male coupling unit is out of engagement with the female coupling members 30 as shown in Figure 4. In this disengaged position of the coupling device, the male coupling unit is angularly disposed on the stub shaft 32 so that the dogs 35 are clear of the members 30, the opposite arm portions 42, 47 being tapered so that they also clear the members and are substantially parallel thereto when the male unit is in such angular position. When the coupling device is thus disengaged the front wheel axles are completely free-wheeling, being totally disengaged from the remainder of the drive assembly.

Figure 5:
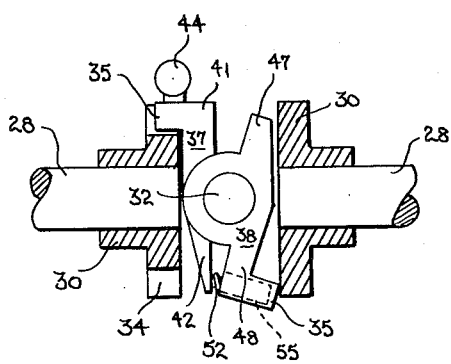
Figure 5 is a detailed section corresponding to Figure 4 showing the coupling device in partially engaged position.
Figure 6:
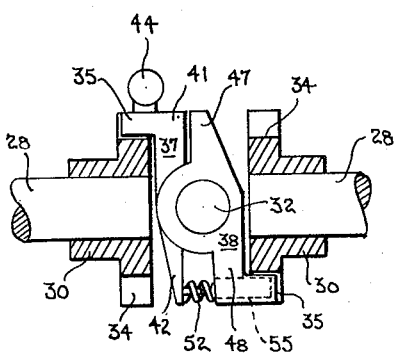
Figure 6 is a detailed section corresponding to Figure 4 showing the coupling device in fully engaged position.

The coupling device is actuated by means of a sleeve 57 which is mounted on the case or housing 27 so that it rotates therewith but is slidable longitudinally thereon, the sleeve being maintained in engagement with the case and guided during relative longitudinal movement as by coacting guide ribs and channels (not shown). The inner wall of sleeve 57 is formed with parallel lugs 58 which project through an opening 60 in the differential case and engage the actuating knob 44 on the arm portion 41 as shown. When the sleeve is actuated for movement to the left, as viewed in Figure 4, the dog 35 on arm portion 41 is brought to bear against the left hand female coupling member 30, and as soon as the latter rotates sufficiently to bring one of its notches 34 into alignment with the dog, the dog moves into the notch as shown in Figure 5. This action rocks the male coupling element 37 on the stub shaft 32, independently of the element 38, and compresses the spring 52 so that the dog 35 on the arm portion 48 is brought to bear against the right hand coupling member 30. As this member rotates, one of its notches 34 is moved into alignment with the dog which snaps into the notch due to the action of the spring, Figure 6. This positively locks the two axles together, and to the case, so that they can be positively driven in either the forward or reverse direction whenever the front-wheel drive is engaged. When it is desired to again disengage the front axles from the remainder of the drive assembly, the sleeve 57 is simply moved back to its right hand position, which rocks the male coupling elements 37, 38 clockwise on the stub shaft so that their dogs 35 are clear of the members 30. During this movement, the arm portion 41 actually moves into contact with arm portion 47 to rock element 38, the spring 52 re-aligning the elements thereafter.

Figure 2:
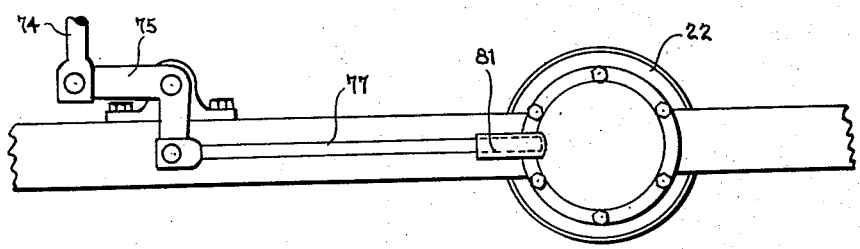
Figure 2 is a front elevation of the differential carrier and axle housing showing a portion of the actuating mechanism.
Figure 1:
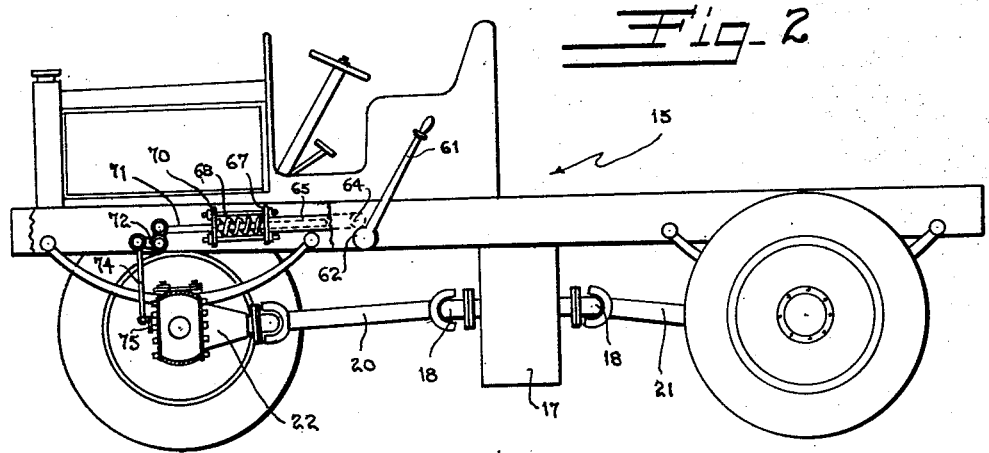
Figure 1 is a side elevation of an all-wheel drive vehicle incorporating an axle coupling device embodying the invention, certain parts being broken away or shown in section to more clearly illustrate the operation of the actuating mechanism for the device.

As indicated diagrammatically in Figures 1, 2 and 3, the sleeve 57 can be moved to the left or right, to engage or disengage the coupling device, by means of a suitable actuating lever 61 located adjacent the driver's seat of the vehicle. Pushing this lever forward causes a rod 62 extending across the frame of the vehicle and a bell crank 64 secured to the right end of the rod to rotate in the counter-clockwise direction. Bell crank 64 is connected to a tube 65, and as it pivots it moves the tube and a plate 67 mounted on the end of the tube to the left compressing a spring 68. Spring 68 bears against a plate 70 connected to a rod 71 the rear end of which is slidably supported by the tube. The rod 71 is connected by means of bell crank 72, link 74, bell crank 75 and link 77 to the sleeve 57. Therefore, compressing the spring 68 exerts a force on this linkage which causes the left hand dog 35 to snap into engagement with the left hand female coupling 30 as soon as one of the notches 34 moves into alignment therewith. The link 77 terminates in a lug 78, Figure 4, which passes through a slot (not shown) in the differential carrier 22 and engages in an annular groove 80 in the outer wall of the sleeve. The slot is covered by, and the end of link 77 is slidably supported by, an L-shaped conduit 81 fixed to the differential carrier cover, as shown in Figures 2 and 3. A suitable compensating mechanism (not shown) is associated with link 74 so that relative motion between the vehicle chassis and axle housing will not cause the actuating mechanism to be operated each time the vehicle hits a bump in the road.

From the foregoing description, it will be apparent that the invention disclosed herein provides a novel and highly practical coupling device for all-wheel drive vehicles of all types. The device enables these vehicles to perform at top efficiency whenever the front-wheel drive is disengaged, and at the same time insures a positive front driving axle in either the forward or reverse direction when the front-wheel drive is engaged with the remainder of the power train.

The invention may be embodied in other specific forms without departing from the spirit or essential characteristics thereof. The embodiment disclosed is therefore to be considered in all respects as illustrative and not restrictive, the scope of the invention being indicated by the appended claims.

What is claimed is:

1. In an all-wheel drive vehicle having a rotatable housing and front-wheel axles terminating at their inner ends within said housing, a female coupling member fixed to the inner end of each axle, said members being a spaced parallel relation to one another within said housing, a male coupling unit rockably journalled in said housing between said female coupling members, said unit being normally out of engagement with said members, and means operable from outside said housing to move said unit into engagement with said members to rigidly lock said shafts together.

2. In an all-wheel drive vehicle having a rotatable housing and front-wheel axles terminating at their inner ends within said housing, a female coupling member fixed to the inner end of each axle, said members being in spaced parallel relation to one another within said housing, a pair of inter-engaging male coupling elements mounted for independent pivotal movement in said housing, said elements being normally out of engagement with said members, manually operable means to move one of said male coupling elements into positive engagement with one of said female coupling members, and resilient means operable upon the engagement of said one element with said one member to move the other element into positive engagement with the other member.

3. In an all-wheel drive vehicle having a rotatable housing and front-wheel axles terminating at their inner ends within said housing, a positive clutch axle coupling device comprising a female clutch member fixed to the inner end of each axle, said members being in spaced parallel relation to one another within said housing, a stub shaft secured to said housing and extending between said members, first and second interengaging male clutch elements mounted for independent rocking movement on said stub shaft, said elements being normally angularly disposed on said shaft so as to be out of engagement with said members, actuating means slidably mounted on said housing to move said first male clutch element into positive engagement with one of said female clutch members, and spring means coacting with said male clutch elements and operable upon movement of said first element into engagement with said one member to urge said second element into engagement with the other member.

4. In an all-wheel drive vehicle having a rotatable housing and front-wheel axles terminating at their inner ends within said housing, a positive clutch axle coupling device comprising a female jaw clutch member fixed to the inner end of each axle, said members being in spaced parallel relation to one another within said housing, a stub shaft secured to said housing and extending between said members with its axis perpendicular to the axes of said axles, first and second interengaging male clutch elements mounted for independent rocking movement on said stub shaft, each of said elements having an outwardly projecting dog engageable with one of said jaw clutch members, said elements being normally disposed on said shaft to maintain said dogs out of engagement with said members, actuating means operable from the driver's seat of said vehicle to rock said first male clutch element on said shaft and engage its dog with one of said jaw clutch members, and a compression spring interposed between said male clutch elements and operable upon the engagement of said first male clutch element with said one jaw clutch member to move said second male clutch element into engagement with the other jaw clutch member.

5. A device as defined in claim 4 wherein said actuating means includes a sleeve operably connected to said first male clutch element and slidable longitudinally on said housing to rock the element on said shaft.

References Cited in the file of this patent
UNITED STATES PATENTS

| | | |
|---|---|---|
| 1,241,184 | Wood | Sept. 25, 1917 |
| 2,667,252 | Meyer | Jan. 26, 1954 |